April 14, 1970    J. J. BURKE, JR., ET AL    3,506,359

APPARATUS FOR MEASURING LIGHT ABSORPTION OF A SAMPLE

Filed Nov. 7, 1966    2 Sheets-Sheet 1

INVENTORS
JAMES J. BURKE JR.
DOMINIC J. RUGGIERI
BY Townsend and Townsend
ATTORNEYS

United States Patent Office 3,506,359
Patented Apr. 14, 1970

3,506,359
APPARATUS FOR MEASURING LIGHT
ABSORPTION OF A SAMPLE
James J. Burke, Jr., Mountain View, and Dominic J. Ruggieri, Fremont, Calif., assignors to Optics Technology, Inc., Palo Alto, Calif.
Filed Nov. 7, 1966, Ser. No. 592,499
Int. Cl. G01j 3/42; G01n 1/10, 21/22
U.S. Cl. 356—93                         10 Claims

ABSTRACT OF THE DISCLOSURE

A sample is placed within a vessel and subjected to light from a light source placed at the center of the sample and directing light to the vessel. The intensity of the light reaching the vessel is a function of the light absorption of the sample. Light striking the interior surface of the vessel is collected and its intensity is measured to determine the light absorption of the sample.

---

This invention relates to a device for measuring optical absorptions of turbid suspensions.

Currently, in matter analysis, fluids and small particles are subjected to environments in order to obtain an analysis of the physical and mechanical properties of the particles or fluids. One of the physical effects which will provide the aforesaid information is the optical absorption characteristic of materials at different wavelengths.

The present invention is concerned with a device which will transmit optical energy through test materials in such a manner as to provide a reliable and accurate readout of the optical energy absorbed by the test media. In the present invention, a transparent quartz vessel or housing is filled with a test medium such as a turbid suspension. A light pipe is arranged to emit controlled light from the center of the test medium for dissemination outwardly through the test medium to the walls of the housing or vessel. The optical energy is disbused, diffused and absorbed in its travel through the test media in that the average path length of the light from the center of the housing to its inside surface is much greater than the geometrical distance separating the center and this surface. Some of the light scattered in the vicinity of the inside surface of the vessel is conducted along and in the walls of the housing to a phototube the current from which is thus proportional to the density of light radiation at the outside of the test medium.

The optical energy entered into the test medium is controlled by the apparatus of the present invention to either be a monochromatic source or, alternatively, a plurality of wavelength scans in which the wavelength can extend between predetermined wavelengths at a predetermined scan rate to provide an absorption spectra analysis of the light absorption of the test medium.

A feature and advantage of this invention lies in the fact that the vessel serves the dual purpose of acting as a vessel for holding the suspension and at the same time as a probe for measuring the density of the radiation at the periphery of the suspension.

A further feature and advantage of this invention lies in the fact that the light is transmitted through a light pipe to project the light from a position in the approximate geometrical center of the test medium so that in the distance from the light source to the vessel the different light paths will be satistically equal.

Still another feature and advantage of this invention lies in the fact that the vessel substantially entirely surrounds the test medium and the light density radiation that has traveled the satistically equal paths from the source to the vessel is effectively averaged over the spherical surface surrounding the test medium by the transmission of light within and along the walls of the vessel to the phototube, and substantially all the light that gets into the medium and is not absorbed is sampled.

Still another feature and advantage of this invention lies in the fact that the light pipe input allows a control of the input light both in intensity and in wavelength to obtain the spectral input desirable for the aforesaid type of physical and chemical analysis.

Another feature and advantage of the invention lies in the fact that the vessel can be changed and purged of the test medium during continuous optical reading without effecting the standardization and accuracy of the instruments.

Another feature and advantage of this invention lies in the fact that the test vessel is optimally constructed in a sphere in order to obtain the most uniform light path lengths between the light source and the walls of the container. The physical configuration also lends itself to an excellent geometry for purging the container of test fluids because of the symmetry of the internal faces of the spherical body; thus, the device can be constructed in perfect harmony for both optical as well as mechanical requirements.

Other objects, features and advantages of the present invention will be more apparent after referring to the following specification and accompanying drawings in which.

Figure 1:
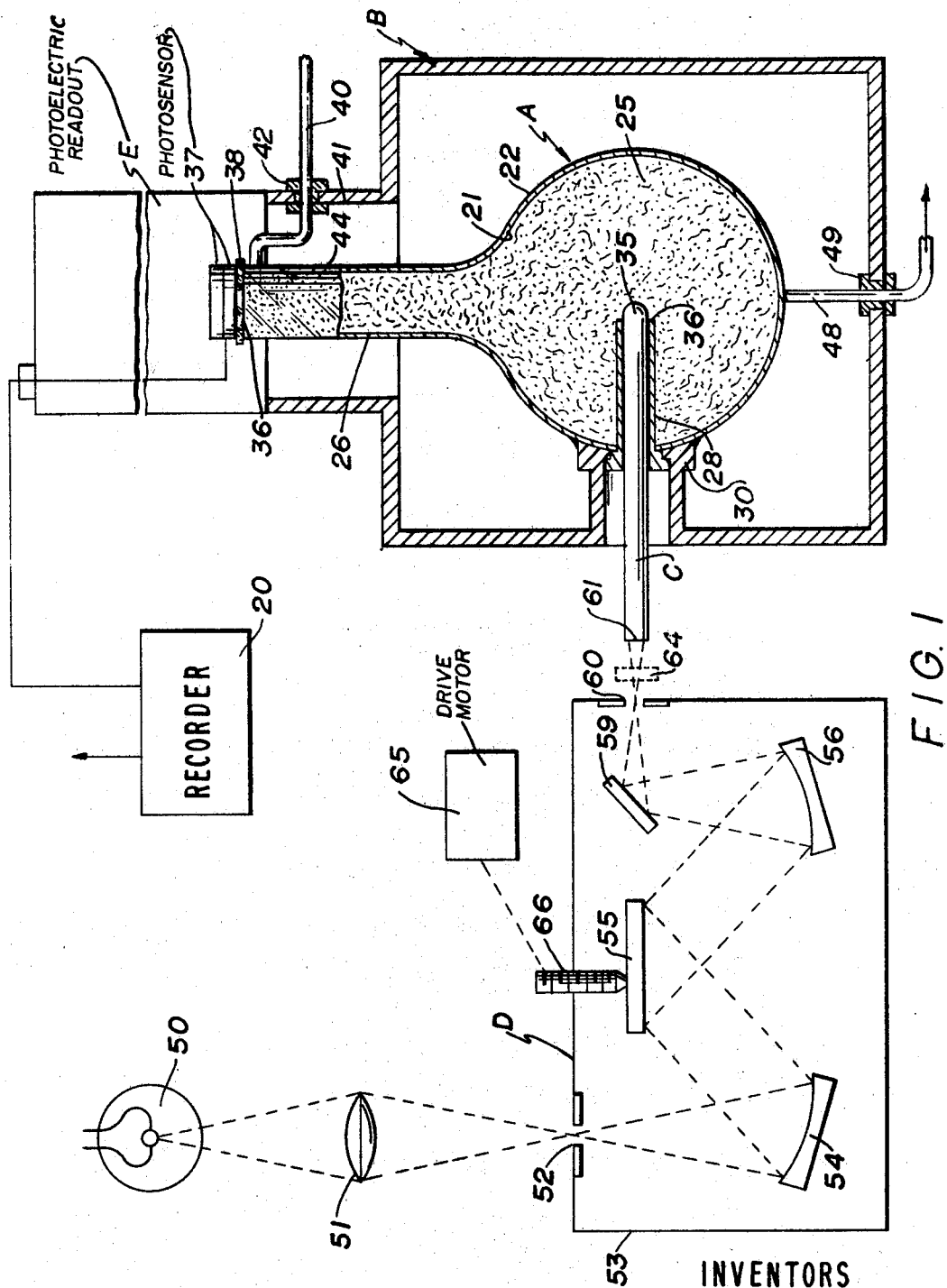
FIG. 1 is a diagrammatic view of the invention.

Referring now to the drawings, there is provided a vessel A adapted to carry a test medium. The vessel is mounted within a lighttight housing B and is constructed with a light input tube or pipe C mounted in the side wall thereof which extends to the center of the vessel. A light source mechanism D is arranged to project light on light input tube C for projection into the center of the materials contained within vessel A. A photoelectric readout mechanism E is arranged to view and read light transmitted within and along the walls of vessel A and to transmit the electrical signal derived thereby to a conventional recorder 20.

Vessel A is constructed of clear quartz with smooth inner wall surfaces 21 and outer wall surfaces 22. Vessel A is formed in a spherical configuration and due to the spherical shape forms a medium test chamber 25 opening to a cylindrical neck 26. The light pipe C is arranged to enter the side wall of vessel A for termination proximate the geometric center of test chamber 25. Light pipe C is contained and fitted within vessel A in an opaque cylindrical housing 28 which is fitted to the side walls of vessel A by a flange ring 30.

Housing B is arranged to form a lighttight housing circumventing the entire periphery of vessel A and is joined to flange fitting 30 in a lighttight sealed relationship. Thus, housing B functions to exclude all ambient light from the exterior of the vessel. It is noted that the photoelectric measuring device is also connected to housing B in a similar lighttight relationship.

Light pipe C is arranged at its end to form a frosted light diffusing bulb which projects outwardly from the end 36 of light shield 28. The bulb, as previously stated, is positioned at the proximate center of test chamber 25. Shield 28 functions to prevent any light emission from light tube C into the chamber other than at bulb 35, thus causing all light emission into the test chamber to be within an area proximating the geometrical center thereof.

Photosensing device E is mounted within a housing and is arranged with a photosensor 37 in optical communication with the edge 36 of neck 26 of vessel A. By this means, the photosensor 37 receives light substantially only from the edge of the vessel. The light, therefore, sensed by photoelectric sensor 37 will be only light transmitted within and along the walls of the glass chamber. A filter 38 can be inserted between photosensor 37 and the edge 36 to limit the wavelength at which photosensor 37 will be responsive.

The electrical output from photoelectric sensor 37 is fed in the usual way to recorder 20. The electric sensor 37 may be simply a photoelectric cell or, if increased sensitivity is required, a photomultiplier can be employed in combination with a photosensing element which, in turn, can either produce a voltage or current proportional to the light impingement thereon or a comparable change in resistance.

The input of test medium is fed into test chamber 25 through an opaque conduit 40 which passes through housing wall 41 via a lighttight fitting 42 and thereafter passes through the side wall 4 of neck 26 of vessel A. A similar purging tube 48 is connected to the bottom of vessel A and descends through fitting 49 to the exterior of lighttight housing B. By means of the conduits 40 and 49, test medium can be inserted into and purged from the vessel.

The light source for the device is established by a xenon arc light source 50 which projects the light through an objective lens 51 into an aperture 52 of a light box 53. The light upon entry to the light box is directed to a concave mirror 54 and thence to a diffraction grating 55 and a similar concave mirror 56 whereupon the light is reflected to an exit mirror 59 and out of exit aperture 60 for projection onto an input end 61 of light pipe C.

Motor drive 65 is arranged to move diffraction grating 55 in a predetermined regular pattern by a drive mechanism 66. Movement of the diffraction grating in the drive system selectively changes the wavelength of light reflected from mirror 54 to 56. Thus, by moving the grating through predetermined angles via the drive mechanism 66, the wavelength of the light at the exit aperture 60 varies between predetermined limits. The xenon 50 can be arranged to produce light throughout the range, for example, 220 to 620 millimicrons. With a full range of movement of diffraction grating 55, a scan between the 220–620 millimicron range can be effected and projected on the input end 61 of light pipe C. More specific control of the movement of grating 55 can restrict the wavelength to any desired range within the spectrum of xenon light source 50. It is noted that filter 64 can be inserted between exit aperture 60 and light pipe C to limit wavelength of light passage to the light pipe within predetermined limits. The photosensor 37 should, if possible, be linear in sensitivity to the optical range employed by the device or, if not linear, appropriate electrical circuitry can be employed to compensate for the non-linearity.

In operation, a test medium is inserted into the test chamber 25 through conduit 40. It has been found that for best sensitivity the level of the test medium should extend up the neck from the spherical portion of the vessel to preserve the continuity of the light traveling along the wall portion. The medium may be of any material which will absorb light within the spectrum employed by the device and particularly good sensitivity is achieved where the medium is a suspension in which considerable light scattering takes place. For example, such materials as bacteria cells, either in their natural state or pigmented with dyes in an aqueous solution, can be employed. Other materials such as polystyrene latex and other turbid materials can also be beneficially examined.

The bulb at the end of light pipe C is formed with a roughened surface to diffuse the light emission therefrom. Light emitted from bulb 35 passes through the test medium to the inside surface 21 of vessel A. As can be seen, the bulb 35 being in the geometrical center of the vessel allows substantially equal length light patterns and in the case of high light scattering suspensions statistically equal light paths from the bulb to the surface areas of vessel A.

As the light passes through the test material it is diffused and dispersed at various angles and, as such, substantially all the light that gets into the test medium in the vessel and is not absorbed is sampled. As a result, the light is conducted within and along the vessel to edge 36 where the quantum of light is seen by the photosensing device 35. The photosensing device therein produces an electrical signal which is an analogue of the quantum of light reaching the inside surface of the vessel.

As has been previously described, the light entering light pipe C is preferably monochromatic and can vary in wavelength between predetermined limits as controlled by the projection from light source 50 and the position of diffraction grating 55. Recorder 20, thus, can measure and record the amount of light transmission through the test medium at each of the wavelengths of light. This, in turn, of course, will vary inversely with the amount of absorption the test medium exhibits for light at each particular wavelength. It can be seen that profiles of light absorption at the various wavelengths of various materials can thus be obtained.

In some instances, it may be desirable to examine materials at specific predetermined wavelengths. In such event, selected filters at the input such as filter 64 and at the output such as filter 38 can be employed.

Figure 2:
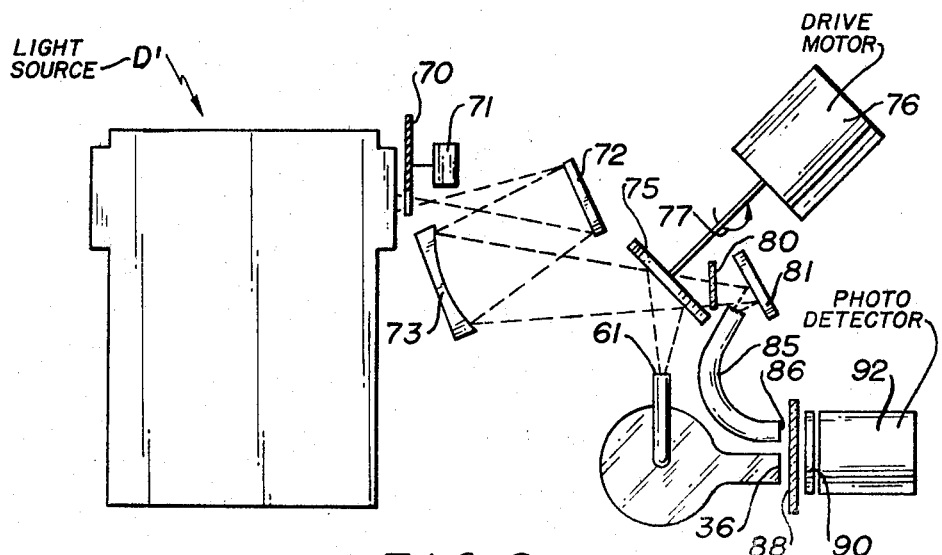
FIG. 2 is a view of an alternative control light apparatus which provides a reference signal for comparative analysis.
Figure 3:
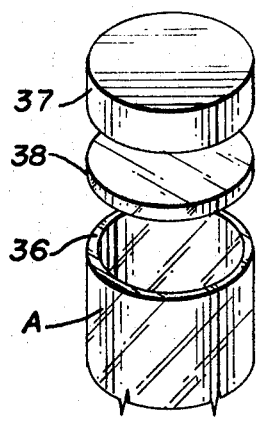
FIG. 3 is an exploded view of light sensing apparatus in relation to the test vessel.

As shown in FIG. 2, standardization and reference signals can be obtained by projecting a supplementary light onto the photomultiplier derived from the same light source. In FIG. 2, a light source mechanism D', identical to D as shown in FIG. 1, is arranged to project output of varying wavelength monochromatic light. The light is then passed through a mechanical chopper 70, which is driven by a motor 71 to cause a pulse output for projection onto a reflecting mirror 72 and thence to a focusing mirror 73 to a rotating mirror 75. Mirror 75 is rotated by motor 76 in the direction indicated by arrow 77. The light from rotating mirror 75 is thence projected onto input end 61 of pipe C of vessel A as described in reference to FIG. 1. The mirror 75 may be a half mirror or slit to provide periodic transmission of the light through a controlled mesh screen 80 onto mirror 81 for reflection into a light pipe 85. A photomultiplier tube shutter 88 is arranged to pass light both from the output end 86 of light pipe 85 and the light output edge 36 of vessel A onto a ground glass diffuser 90 for subsequent impingement upon a photomultiplier and photodetector 92.

As previously stated, mirror 75 can either be slit to provide an aperture or can simply be a half mirror to alternatively switch the light output to the photomultiplier between the test or reference light pipe 85 and vessel A. By common techniques, the relationship of the two signals can then be employed to establish input light intensities and wavelengths against which the absorbency of the test medium within vessel A can be referenced.

While one embodiment of this invention has been shown and described, it will be apparent that other adaptations and modifications can be made without departing from the true spirit and scope of the invention.

What is claimed is:

1. An apparatus for measuring the light absorbency of particles comprising: a light conductive housing having a wall with a transparent inner face viewing the interior of said housing, a body of particles carried within said housing and in intimate contact with the transparent housing wall, illumination means mounted within said housing in intimate contact within said particles and spaced from said housing wall, detector means connected to said housing wall to determine the quantum of unabsorbed light conducted therein and therealong from said particles, and means shielding said detector means from exposure to the entire exterior surface of said housing.

2. A method of determining light absorbency of particles having the steps of: grouping the particles in a light conductive spherical body, directing light from the center of said body to the periphery of said body, collecting unabsorbed light around the periphery of said body, and converting the collected light to electrical energy in proportion to the quantum of light collected to thereby obtain an electrical signal which is an analogue of the light absorbency of the particles.

3. An apparatus for measuring the light absorbency of particles comprising: a light conductive housing having a wall with an inner face viewing the interior of said housing; a body of particles carried within said housing and in intimate contact with the inner face; illumination means mounted within said housing in intimate contact with said body of particles and spaced from said inner face, said wall including an edge projecting away from said body of particles; and means located at said edge of said housing wall to determine the amount of unabsorbed light conducted therewithin and therealong originating from said illumination means.

4. A device according to claim 3 and wherein said illumination means is monochromatic.

5. A device according to claim 3 and wherein said housing is generally spherical and said illumiantion means is mounted in the geometrical center of said housing.

6. A device according to claim 3 and having means shielding said housing from ambient light.

7. A device according to claim 3 and wherein said illumination means comprises a variable wavelength monochromatic light source and means to controllably vary the wavelength of said light source.

8. A device according to claim 3 and wherein said illumination means comprises: a light pipe constructed with a light emitting tip located in the geometric center of said housing and an opposite end mounted externally thereof, means shielding all portions of said light pipe within said housing excepting said tip, and means to project light from said tip by projection of light through an input end of the light pipe.

9. An apparatus for measuring the light absorbency of particles comprising: a light conductive housing with a wall having an inner face viewing the interior of said housing for transmitting light within and along the housing wall when impinging thereon, a body of light dispersing particles carried within said housing and in intimate contact with said inner face, a light pipe having a first end mounted within said housing in intimate contact with said body of particles and spaced from said inner face, and a second end projecting externally of said housing, a light source means to project said light source through the second end of said light pipe for projection at the first end thereof, means shielding all portions of the exterior of said housing from ambient light, means shielding all portions of the light pipe on the interior of said housing except said first end, and sensing means to sense the total amount of unabsorbed light conducted through said housing.

10. An apparatus for measuring the light absorbency of particles according to claim 9 and having means optically coupled to said sensing means and said light source to cause said sensing means to sense the quantum of light output of said light source, and means to alternatively couple said sensing means to said housing and said light source.

References Cited

UNITED STATES PATENTS

| | | | |
|---|---|---|---|
| 3,163,767 | 12/1964 | Witt et al. | 350—96 X |
| 3,164,663 | 1/1965 | Gale | 350—96 X |
| 3,170,068 | 2/1965 | Petriw et al. | 88—14 X |
| 3,311,014 | 3/1967 | Witt et al. | 88—14 |
| 3,392,623 | 7/1968 | Walker et al. | 350—96 X |
| 3,433,570 | 3/1969 | Hansen | 356—74 XR |

RONALD L. WIBERT, Primary Examiner

F. L. EVANS, Assistant Examiner

U.S. Cl. X.R.

250—218, 227; 350—96; 356—97, 201, 205, 246